US007343329B1

(12) United States Patent
Sharp

(10) Patent No.: US 7,343,329 B1
(45) Date of Patent: *Mar. 11, 2008

(54) NETWORKED SOFTWARE AND SERVICE DISPENSING VENDING MACHINE

(75) Inventor: Maurice Sharp, Cupertino, CA (US)

(73) Assignee: PalmSource, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/087,373

(22) Filed: Feb. 28, 2002

(51) Int. Cl.
*G06F 17/30* (2006.01)

(52) U.S. Cl. .............................. 705/27; 705/21; 703/27; 709/200

(58) Field of Classification Search ................ 700/234; 705/26, 14, 16, 27; 703/23, 27; 712/227; 717/176, 177, 178; 709/200
See application file for complete search history.

(56) References Cited

U.S. PATENT DOCUMENTS

| 5,926,624 | A * | 7/1999 | Katz et al. ................... 709/217 |
| 6,470,232 | B2 * | 10/2002 | Parry ........................ 700/233 |
| 2002/0023028 | A1 * | 2/2002 | Quarendon et al. ........... 705/26 |
| 2002/0023215 | A1 * | 2/2002 | Wang et al. .................. 713/171 |
| 2002/0073025 | A1 * | 6/2002 | Tanner et al. ................. 705/39 |
| 2002/0099658 | A1 * | 7/2002 | Nielsen et al. ............... 705/43 |
| 2002/0161476 | A1 * | 10/2002 | Panofsky et al. ........... 700/231 |
| 2002/0162009 | A1 * | 10/2002 | Shmueli et al. ............. 713/200 |
| 2002/0169677 | A1 * | 11/2002 | Willner et al. ................ 705/26 |
| 2002/0174010 | A1 * | 11/2002 | Rice, III ....................... 705/14 |
| 2002/0188863 | A1 * | 12/2002 | Friedman ..................... 713/201 |
| 2003/0040962 | A1 * | 2/2003 | Lewis ........................... 705/14 |
| 2003/0105948 | A1 * | 6/2003 | Kikinis et al. ................. 713/1 |
| 2003/0115038 | A1 * | 6/2003 | Want et al. .................... 703/24 |

OTHER PUBLICATIONS

White, Ron, How Computers Work, Millennium Ed. Que Corporation, Sep. 1999.*
Derfler, Frank J. et. al. How Networks Work, Millennium Ed., Que Corporation, Jan. 2000.*
Gralla, Preston, How the Internet Works, Millennium Ed., Que Corporation, Aug. 1999.*

* cited by examiner

*Primary Examiner*—Andrew Joseph Rudy
*Assistant Examiner*—Vanel Frenel
(74) *Attorney, Agent, or Firm*—Berry & Associates P.C.

(57) ABSTRACT

Embodiments of the present invention are directed to a networked software and service dispensing vending machine (also referred to as a "software ATM") for dispensing software and providing services to a portable computer system. Software stored on the software ATM is offered for sale and, once payment is received, downloaded into a portable computer system. A communications interface on the software ATM allows communications with the portable computer system. The software can be displayed on the software ATM prior to being purchased. Once payment is received for the software, it is downloaded into the portable computer system using the communications interface. A network connection on the software ATM provides communications with a network server.

25 Claims, 9 Drawing Sheets

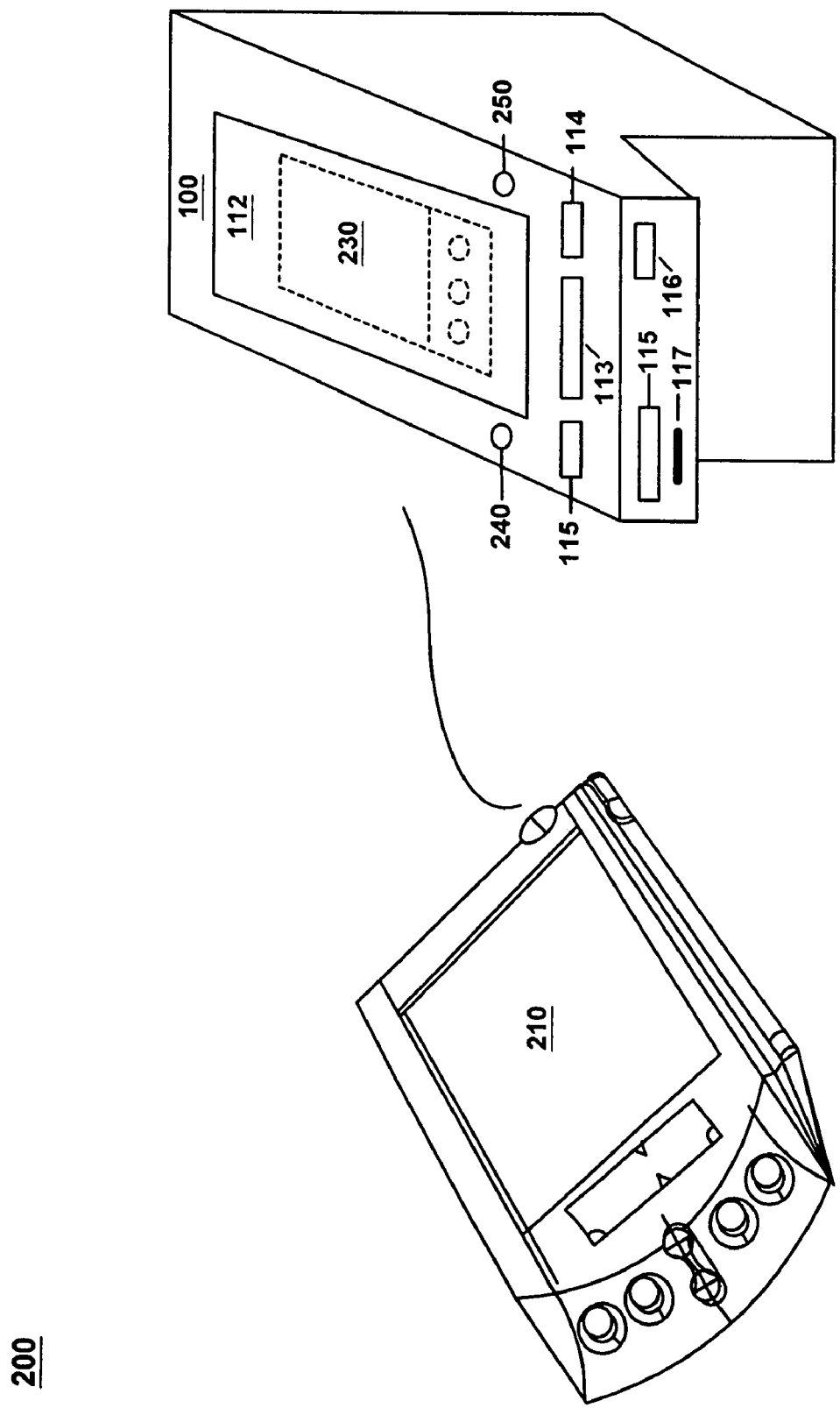

300

| BASKETBALL |
|---|
| LAKERS V JAZZ |
| JAZZ V CELTICS |
| APPLICATION3 |
| APPLICATION4 |
| APPLICATION5 |
| APPLICATION6 |
| APPLICATION7 |
| APPLICATION8 |
| 310 |

| GAMES |
|---|
| SOLITAIRE |
| HEARTS |
| BRIDGE |
| CHESS |
| APPLICATION5 |
| APPLICATION6 |
| APPLICATION7 |
| APPLICATION8 |
| 320 |

| STOCKS |
|---|
| ABC |
| XYZ |
| AMC |
| PALM |
| 3-COM |
| APPLICATION6 |
| APPLICATION7 |
| APPLICATION8 |
| 330 |

FIGURE 3

| BASKETBALL | |
|---|---|
| APPLICATION1 | * * * |
| APPLICATION2 | * * * |
| APPLICATION3 | * * |
| APPLICATION4 | * |
| APPLICATION5 | * * * |
| APPLICATION6 | * * * * |
| APPLICATION7 | * * * |
| APPLICATION8 | |

410

| GAMES | |
|---|---|
| APPLICATION1 | * * |
| APPLICAITON2 | * * * |
| APPLICATION3 | * * |
| APPLICATION4 | * |
| APPLICATION5 | * * * |
| APPLICATION6 | * * |
| APPLICATION7 | * * * |
| APPLICATION8 | * |

420

| STOCKS | |
|---|---|
| APPLICATION1 | * * |
| APPLICAITON2 | * * * |
| APPLICATION3 | * * |
| APPLICATION4 | * |
| APPLICATION5 | * |
| APPLICATION6 | * * |
| APPLICATION7 | * * * |
| APPLICATION8 | * |

NETWORKED SOFTWARE AND SERVICE DISPENSING VENDING MACHINE

FIELD OF THE INVENTION

Embodiments of the present invention relate to the field of computer software applications and services. More specifically, embodiments of the present invention relate to a device for distributing computer software and providing computer network services.

RELATED APPLICATIONS

The co-pending application No. 10/087,370 filed Feb. 28, 2002 and entitled A Method and a System for Computer Distribution Using Networked Software Dispensing Vending Machines by Maurice Sharp, Steve Stefanik, and Gabriel Acosta-Lopez assigned to the assignee of the present invention, is hereby incorporated herein by reference in its entirety.

BACKGROUND OF THE INVENTION

The number of software applications used by a typical computer system user has rapidly increased over the past few decades. The increase in software applications among owners of portable computer systems has also increased to the point where owners of personal digital assistants (PDAs) maintain a library of computer software programs at their disposal.

The available distribution channels for software dictate, more than any other factor, the availability of software applications for computer users. In other words, the limited number of software distribution channels available today, not the software developers, dictates the availability of software for end users. This is the result of most software developers having no direct outlet to end users. Instead, they must use some established form of software distribution channel. For various economic reasons, as described below, most software distribution channels restrict the number of software titles that are available to end users.

Moreover, software titles for PDAs typically sell better at lower prices. Typically, the retail prices of software application programs for desktop computer systems are less than the cost of the desktop computer system itself. Thus, the ratio between the software price and the price of the device the software is running on often is the determining factor influencing a users decision to buy a software application. Therefore, a cost effective price point for software applications targeted for PDAs should be in a range that is substantially less than the cost of the PDA itself. For instance, someone that purchases a PDA in the range of $100.00 to $300.00 may not be motivated to purchase a software application for $150.00 (or more), but may acquire several applications in the low cost range of $5.00 to $25.00. Unfortunately, software distribution channels do not readily exist today for distributing large amounts of software titles within this low cost range. Additionally, a user is generally not willing to purchase a software title if they feel an unwarranted amount of effort is necessary to get the new software.

Software titles are primarily distributed today using three software channels: In-store retail, Internet retail, and bundled with hardware. None of these distribution channels offers a reasonable avenue for distributing large amounts of software titles in the low cost range.

Regarding the in-store retail distribution channel, retail outlets provide software applications to customers who can directly visit a store and purchase the software product in a physical medium. However, this distribution channel introduces a number of substantial overhead costs which need to be passed on to the customer, thereby raising the minimum price of the software. For example, distribution of software through retail stores entails expenses related to packaging the products, transporting the products, storing the products, reserving shelf space for the products, and paying wholesaler and retailer profits. These costs, and middlemen profits, often translate into a few hundred percent mark-up for software titles while also requiring a high minimum product price. Also, because limited shelf space must be reserved for software titles, this reduces the number of software titles that any one store can provide. Retailers therefore limit the number of available software applications to the most recent or most popular titles. Developers of low cost software cannot easily compete for shelf space in retail stores, and if they could, the prices charged by retail outlets would be too large to move the products and, finally, the bulk of any profits would go to the retail stores, not the software developers.

Yet another retail channel of distributing software is via the Internet, e.g., by downloading computer software through web vendors that maintain software websites. Retail Internet software distribution does not work well for low cost software titles in part because the high costs of this distribution medium require that web vendors charge a very large percentage commission on each sale. Like in-store retailers, this causes the profit margins to decrease for low cost software developers and also causes the minimum price of the software to be inflated. Moreover, to use this distribution channel, a user has to have knowledgeable access to the Internet (and complex downloading and electronic unpacking techniques) which can restrict the customer base. Many existing web vendors are, in general, not always user friendly and consumers have difficulties in following installation and administrative instructions required in obtaining the software titles.

The third channel of software distribution involves bundling software with the hardware device itself. While useful for a very small number of applications, this software channel does not provide a wide avenue for mass software distribution, including the distribution of low cost software. The costs associated with bundling software with hardware devices make computer manufacturers very selective in the software they bundle. As a result, only a very small number of software titles are bundled with computer systems, be they desktop systems or PDAs. As a distribution channel, this one only provides a very small outlet for software distribution. Moreover, this distribution channel does not readily provide the software user with a mechanism for obtaining post-sale software upgrades, software fixes, etc.

SUMMARY OF THE INVENTION

Therefore, a need exists to provide a distribution channel for distributing low cost computer software to end users while providing an economic incentive for low cost software developers. Moreover, a need exists for distributing computer software for PDA users which is low-cost, easy to use, and easily accessible.

Accordingly, embodiments of the present invention provide a computer software distribution mechanism that can be used by software developers for distributing low cost computer software. An embodiment of the present invention provides a user-friendly environment for purchasing or renting computer programs which is analogous to an automatic teller machine, herein referred to as a "software ATM". In one embodiment, the present invention physically resembles a banking ATM in size and appearance and provides a familiar, user-friendly environment for purchasing or renting computer programs. In other embodiments, the present invention can assume various other configurations according to the requirements of its location. The present invention may be placed in a variety of public locations to provide multiple points of access to end users. Embodiments of the present invention include a computer system including a computer screen, a keyboard and a method for completing a transaction for downloaded software. Various other equipment for communicating with a PDA are also provided in each software ATM, such as wireless or slot based communications equipment.

In one embodiment, the present invention is used as a stand alone system for downloading software or other content such as music or video clips into a users PDA. The user can choose to buy the software or content or rent it for a period of time. In another embodiment, a computer network is established that links computer system servers and software ATMs. Software developers can register their software with the network thereby making it commercially available to each networked software ATM in the vendor's subscriber list. The software ATMs can distribute computer programs with lower overhead than present distribution channels which lowers the cost to the end user and provides more incentive to software developers to create low-cost computer applications.

Due to their locations, the software ATMs are directly accessible to end users of portable computer systems. Therefore, embodiments of the present invention provide an economically efficient software distribution channel for directly connecting end users with low cost software developers. For example, the software ATM can be placed in any public location that facilitates the distribution of software and computer services to end users, e.g., in a coffee shop, a mall, a retail store, an airport waiting area, a theater, near phone booths, in sporting areas, etc.

Retail outlets may be motivated to place software ATMs on or near their facilities for a variety of reasons, e.g., to increase foot traffic in the store or in return for small rental fees paid to them in exchange for the space occupied by the software ATM. An added advantage to retail outlets is that a greater variety of software titles can be offered without requiring additional shelf space. Furthermore, the retailer would not be required to purchase and maintain inventory and sell software titles for reduced profits when they become obsolete. Because of the present invention increases the availability of software titles, software developers will be more likely to create low-cost software applications.

Using the software ATM, a user can cause the display of various available programs, and associated prices (and descriptions and ratings), to appear on the computer screen of the software ATM. Optionally, the list can be cataloged by software type (or by any category) to facilitate finding a specific title and can contain descriptive material regarding each software title, e.g., what it is, how it works, its hardware requirements, and critical software reviews, etc. Selected software titles can be directly installed from the software ATM to the user's portable computer system after paying the required software purchase or rental price. Due to reduced overhead, the software titles are less expensive and payment can be made by cash insertion or by a user's credit or debit card. Payment facilities of the software ATM are automated, much in the same way as other vending machines (e.g., food, toy, or stamp vending machines).

Advantageously, in accordance with one embodiment of the present invention, users can optionally emulate the functionality of their device on the ATMs display screen. A selected application software title can then be emulated on the display screen of the software ATM for testing purposes before the user purchases or rents the computer software. In this way, users can "try out" the software title before purchasing and installing it on their device. In accordance with the present invention, if a user is satisfied with the execution of the selected software on the emulation screen, the software can be purchased or rented using the software ATM. In allowing software to be rented for a limited time period, a user can determine whether they want to purchase a full version of the selected title.

Still another implementation of the present invention provides a user with the ability to use the software ATM to receive the latest software upgrade of his/her installed computer software.

Another implementation of the present invention provides computer services to the user. For example, the software ATM can be used as a back up mechanism for information stored on the user's portable computer system. For a fee, the user can back up data and programs from his/her portable computer system onto the software ATM. This information is then transmitted to one or more of the networked server systems. In this way, a user can restore the data/programs from any remote software ATM that is networked to the server system containing the backed-up data and programs. Should the user's PDA become lost, broken, or stolen, a replacement unit can be updated with the user's back-up data and programs from virtually any location providing a software ATM. Furthermore, in conjunction with the back-up data, embodiments of the present invention allow a user to mimic the performance of their PDA using the device emulator. This allows a user to test a software application and determine whether it will perform satisfactorily upon their particular PDA (as opposed to a generic PDA which is normally generated by the device emulator).

In another embodiment of the present invention, the network of software ATMs can be used to warehouse or archive inactive software programs of a portable computer system. Thus, a user can warehouse inactive software programs to free memory space on their PDA and later download it into their PDA when needed.

In another embodiment of the present invention, the networked software ATMs can be used as Internet access points for users of portable computer systems. A user can initiate communications between their PDA and the software ATM and use the network connection to access the Internet. This would allow users to, for example, remotely access network services such as updating their messages and calendars.

More specifically, embodiments of the present invention are directed to a software and services dispensing vending machine (or "software ATM") for displaying a directory of software programs which can be purchased or rented. Furthermore, in response to a software selection by a user, the software ATM can display the selected software on an emulated version of the user's portable computer system. The software ATM is configured for accepting payment from the user for a selected software program; and in response to the payment, the software ATM downloads the selected software program to the portable computer system of the user.

Embodiments further include the above and wherein, in response to the software selection, the software ATM also emulates a portable computer system executing the selected software program.

These and other advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIGS. 2A, 2B, 2C, and 2D illustrate various embodiments of a software ATM capable of dispensing a computer program to a portable computer system.

FIG. 3 illustrates an exemplary screen-displayed directory of computer programs displayed embodiments of the present invention to a user of a portable computer system.

FIG. 4 is an illustration of an exemplary screen-displayed directory listing rated computer programs in accordance with embodiments of the present invention.

DETAILED DESCRIPTION OF THE PREFERRED EMBODIMENT

Figure 1:
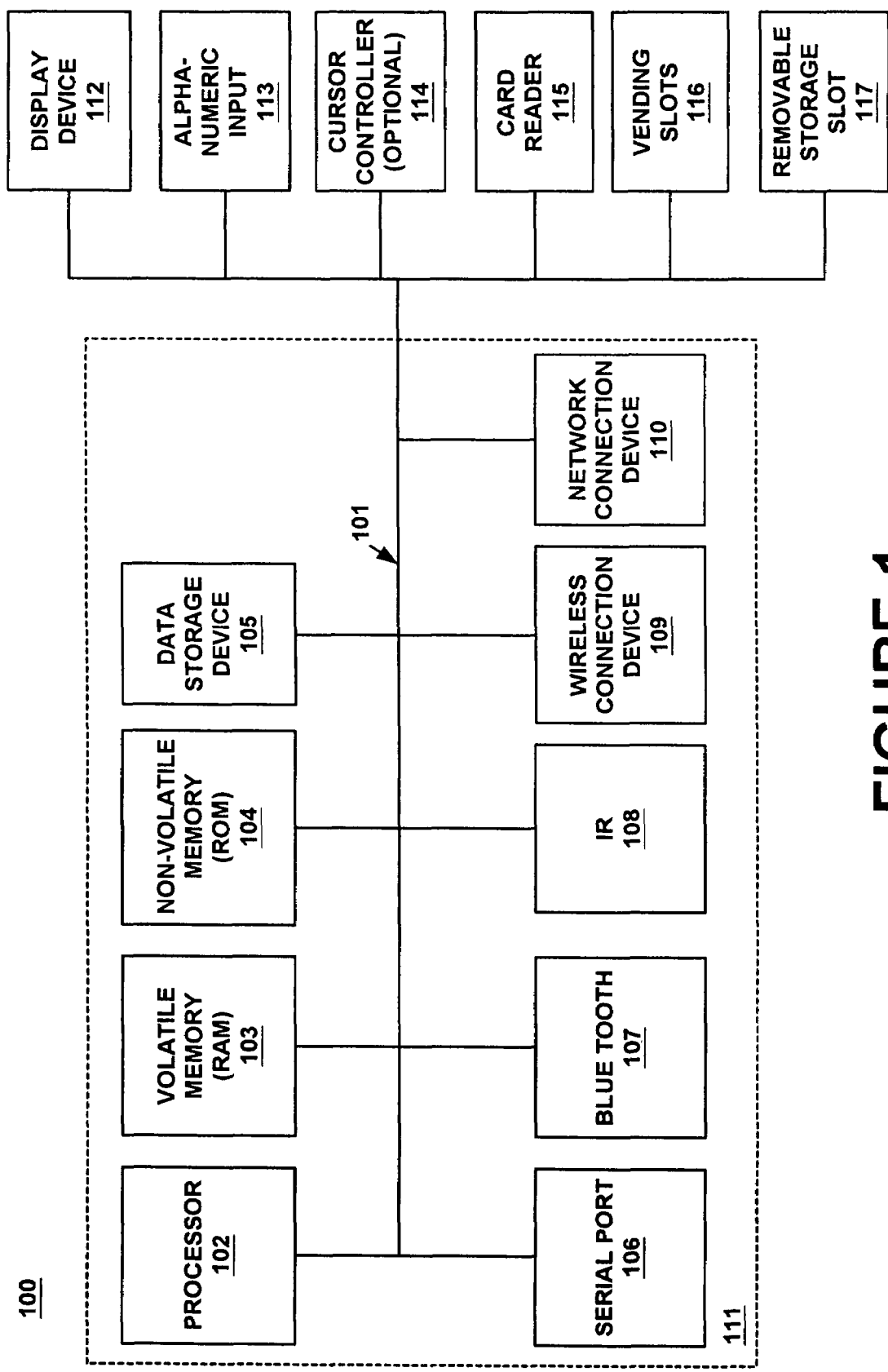
FIG. 1 is a block diagram of an exemplary circuit of a software and service dispensing vending machine ("software ATM") in accordance with one embodiment of the present invention.

The co-pending application Ser. No. 10/087,370 filed concurrently herewith and entitled A Method and a System for Computer Distribution Using Networked Software Dispensing Vending Machines by Maurice Sharp, Steve Stefanik, and Gabriel Acosta-Lopez assigned to the assignee of the present invention, is hereby incorporated herein by reference in its entirety.

Reference will now be made in detail to the preferred embodiments of the present invention, a networked software and service dispensing vending machine, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system. It has proven convenient at time, principally for reasons of common usage, to refer to these signals as bits, values, elements, symbol, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "storing," "receiving," "initiating," "displaying," "signaling," "emulating," "downloading," "updating," "archiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Networked Software Dispensing System Platform

The present invention is compatible with electronic devices having a wireless or other communication protocol and organized records of information, such as a cell phone, pager, electronic address book, and numerous other mobile devices that may have the ability to conduct wireless communications.

One of the common types of electronic systems, which can be used in accordance with one embodiment of the present invention, is referred to as a personal digital assistant, or commonly called a PDA. The PDA is a hand held computer system with the capability to store telephone numbers, addresses, daily appointments, and software that maintains business or personal data such as expenses, etc. Furthermore, the PDA also has the ability to connect to a personal computer, enabling the two devices to exchange updated information, that is, synchronizing the information between the two devices. Additionally, the PDA can also be connected to a modem, enabling it to have electronic mail (E-mail) capabilities over the Internet along with other Internet capabilities. Moreover, an advanced PDA can have Internet capabilities over a wireless communications interface (e.g., radio interface).

FIG. 1 is a block diagram of an exemplary circuit of a software and services dispensing vending machine 100 (referred to herein as a "software ATM") in accordance with one embodiment of the present invention. Software ATM 100 includes an address/data bus 101 for communicating information, and a central processor 102 coupled with bus 101 for processing information and instructions. It is appreciated that central processor unit 102 may be a microprocessor or another type of processor. Software ATM 100 further includes a volatile main memory 103 comprised of volatile random access memory (RAM) for storing the digital information and instructions coupled with bus 101, and a non-volatile read only (ROM) memory 104 (e.g., read only memory, programmable ROM, flash memory, EPROM, EEPROM, etc.) coupled with bus 101 for storing static information and instructions for processor 101. Software ATM 100 also includes a data storage device 105 (e.g., a magnetic drive, optical drive, tape drive, or the like) coupled with the bus 101 for storing vast amounts of information. It should be understood that the software programs being dispensed by software ATM 100 can be stored either in volatile memory 103, non volatile memory 104, data storage device 105, or in an external storage device (not shown).

Software ATM 100 also contains a serial communications port 106, also coupled to bus 101. Serial communications port 106 may be, for example, a serial or USB port coupled with a cradle (not shown) for receiving and initiating communications with a portable electronic device (e.g., personal data assistant or PDA 210 of FIG. 2). The cradle provides an electrical and mechanical communications interface for two-way communications between the portable electronic device and software ATM 100. In addition to device 106, wireless communication links can be established between software ATM 100 and a portable electronic device using a Bluetooth wireless device 107 or an infrared device 108. Furthermore, an additional wireless connection can be provided using wireless device 109. In one embodiment, wireless device 109 is conforms to I.E.E.E. Standard 802.11 for wireless Local Area Network connections. While the present invention recites I.E.E.E Standard 802.11, the present invention is well suited to utilize a variety of wireless communications formats with wireless device 109. A network connection device 110 is coupled with bus 101 for providing two-communications between software ATM 100 and other networked computers and/or the Internet. These components are housed on a circuit board 111 which is contained within software ATM 100.

Embodiments of software ATM 100 also contain a display device 112 coupled to bus 101 for displaying information to the computer user. Display device 112 may be a liquid crystal device (LCD), cathode ray tube (CRT), field emission device (FED, also called "flat panel CRT"), plasma or other display technology suitable for creating graphic images and/or alphanumeric characters recognizable to a user. In one embodiment, display device 112 is a flat panel resistive touch screen device capable of registering a position where contact is made on display device 112 and communicating information (spatial data) and command selections to processor 102. In one embodiment, display device 112 may include a handwriting recognition area and integrated push button areas as well.

Embodiments of software ATM 100 also include an alpha-numeric input device 113 (e.g., a keyboard), and an optional cursor control device 114 coupled with bus 101. Cursor control device 114 is for dynamically signaling the two dimensional movement of a visible symbol (cursor) on display device 112 and communicating user input information and command selections to the central processor 102. Implementations of cursor control device 114 may include a trackball, mouse, resistive touch pad, joystick or special keys capable of signaling movement of a given direction or manner of displacement. Alternatively, it will be appreciated that a cursor can be directed and/or activated via input from alpha-numeric input device 113 or from commands received wirelessly via Bluetooth device 107, infrared device 108, or wireless connection device 109.

Embodiments of software ATM 100 further include a magnetic card reader 115 and vending slots 116 for receiving payment from a user for software to be downloaded by software ATM 100. Magnetic card reader 115 reads magnetic data embedded upon, for example, a credit card, a gift card, or a debit card which uniquely identifies a user's account. Money or credits can then be automatically deducted from the user's account when software is rented or downloaded. Vending slots 116 are for receiving a cash payment (e.g., either coins or bills) and signaling the amount of money deposited to processor 102. Embodiments of software ATM 100 may further include a removable storage slot 117 into which removable storage media may be inserted. Software titles can be downloaded into removable storage media slot 117 and then downloaded into a device via the removable storage media.

FIGS. 2A, 2B, 2C, and 2D depict various embodiments of a system 200 including a software ATM 100, which is an automated automatic teller machine capable of dispensing computer software to a portable electronic device. As previously mentioned, portable electronic devices include hand held computer systems, PDAs, cell phones, pagers, or other type of electronic devices. As shown in FIGS. 2A-2D, software ATM 100 is used for dispensing computer software to PDA 210 and can take on a wide variety of physical configurations.

Figure 2A:
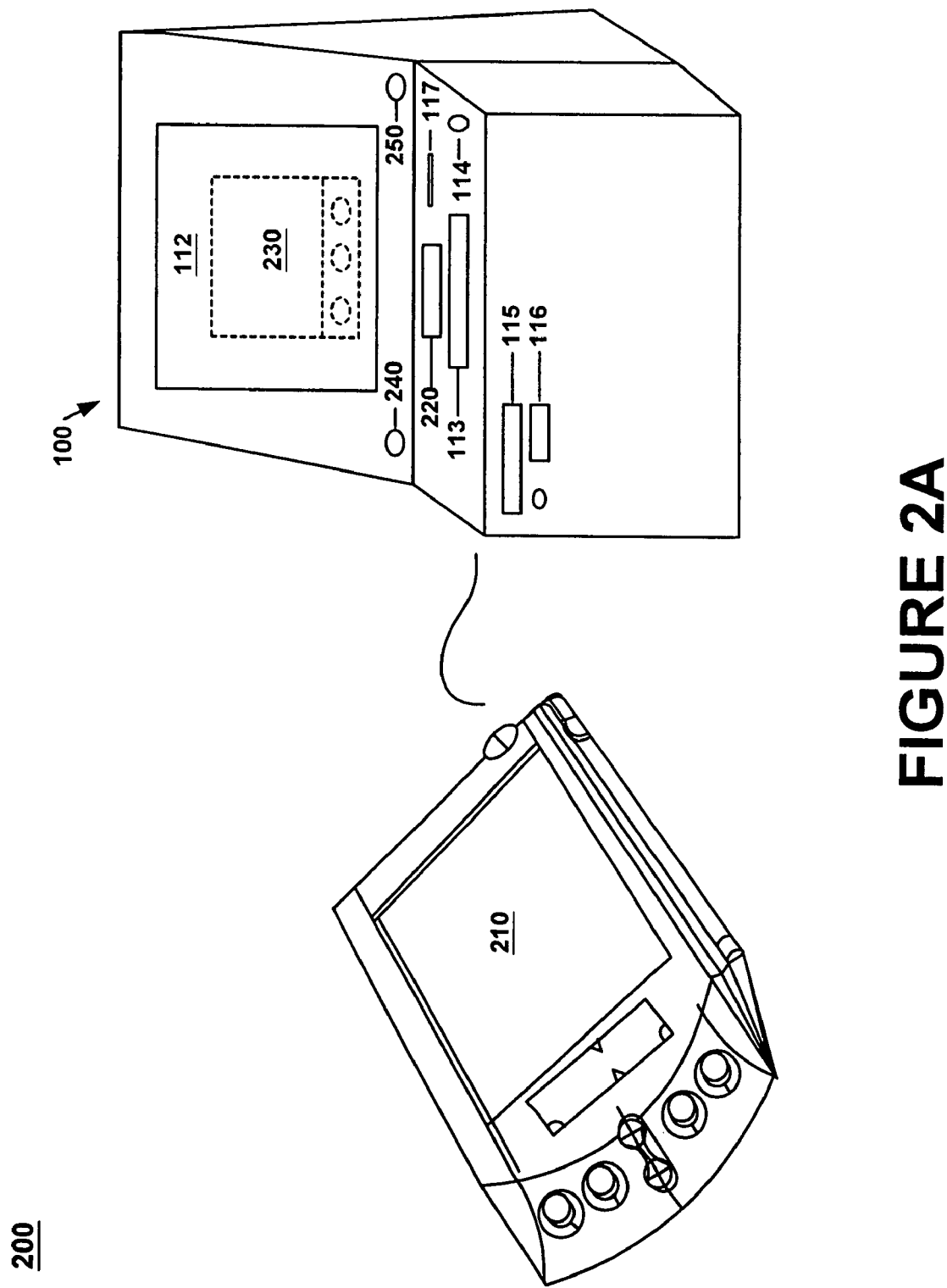
Figure 2B:
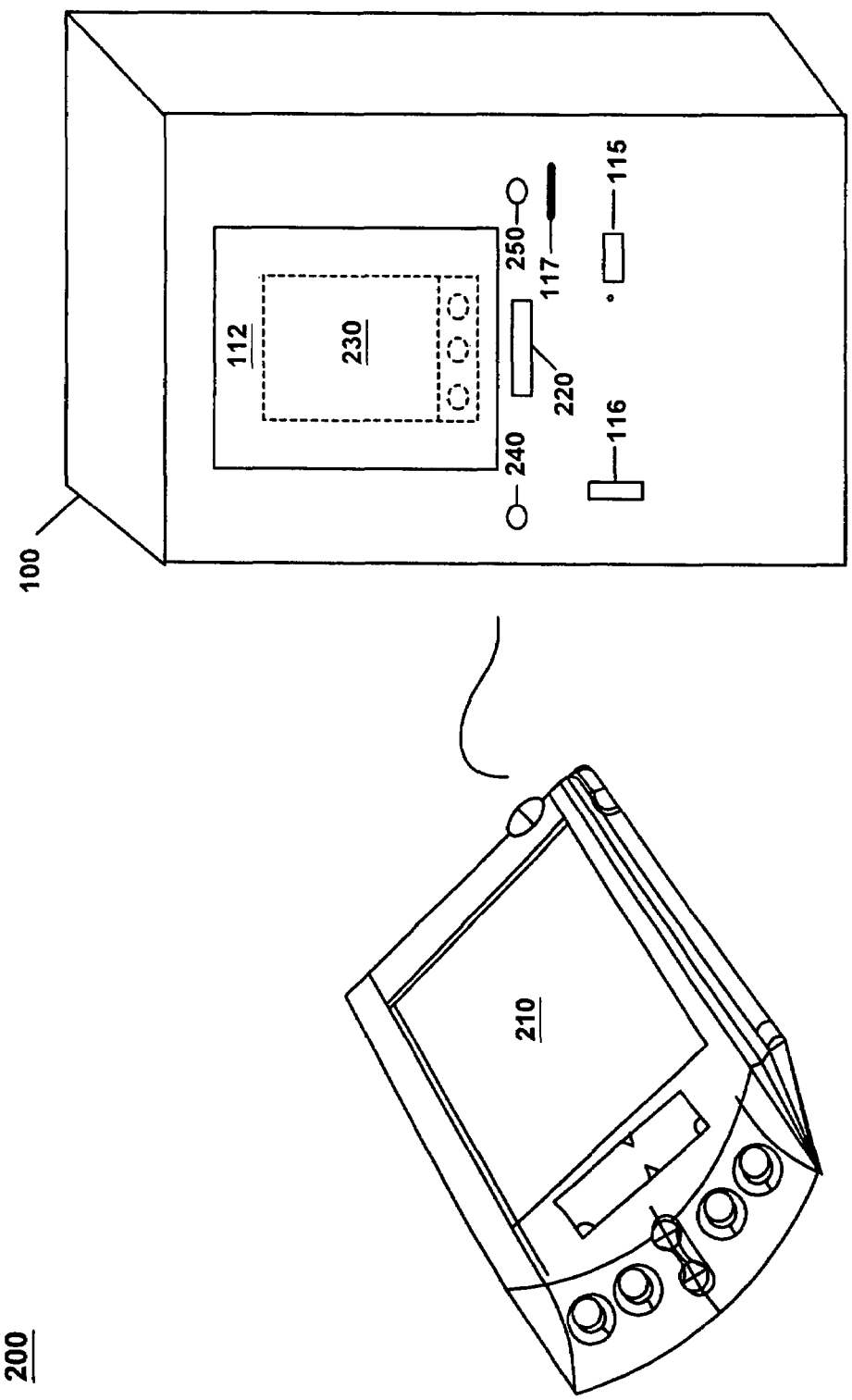
Figure 2C:
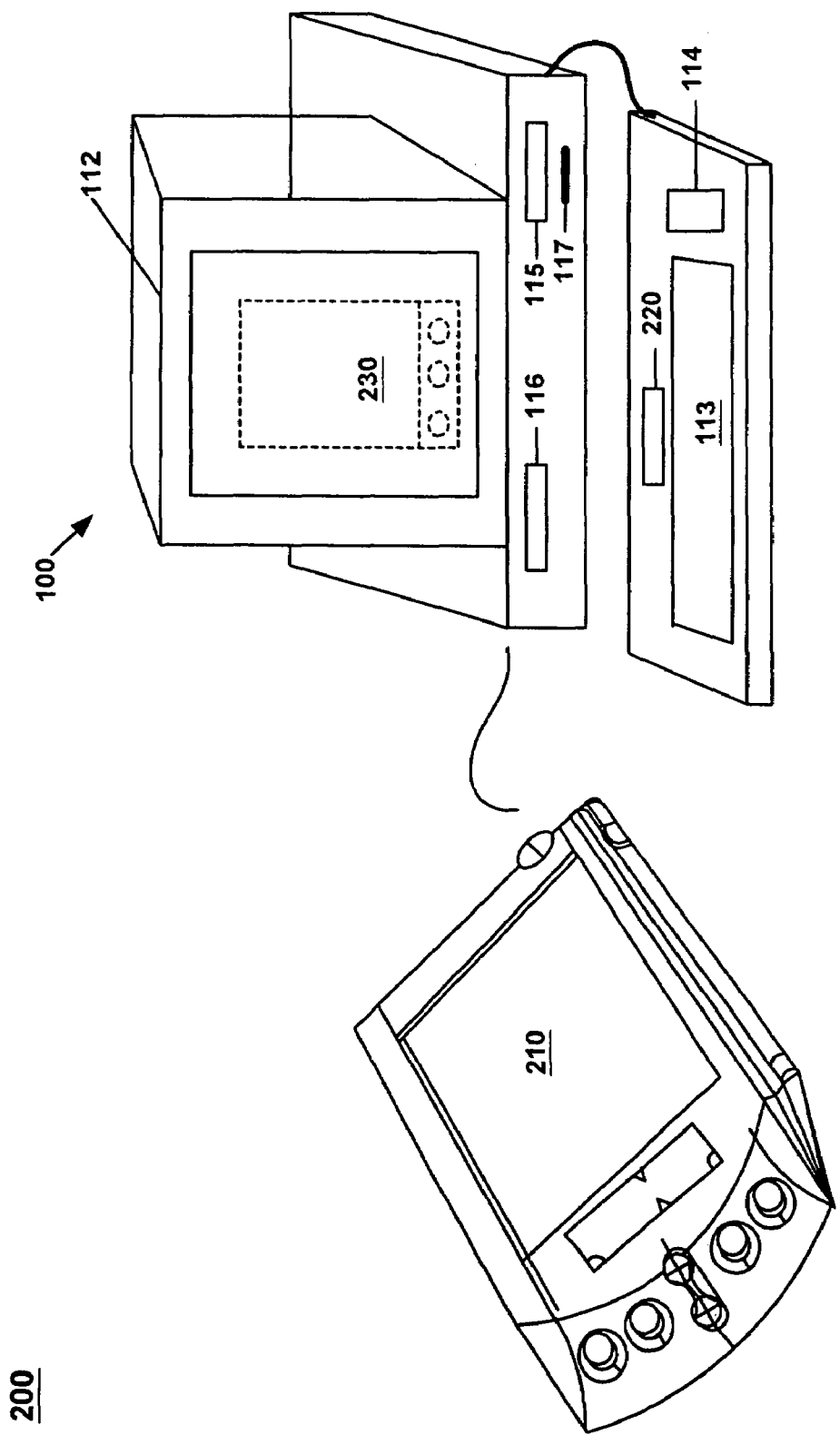

In FIGS. 2A and 2B, software ATM 100 is similarly configured in size and appearance to a banking ATM. This provides a user-friendly software dispensing environment that is familiar to the end user and thus increases the likelihood of its being used. As shown in FIG. 2C, software ATM 100 resembles a desktop computer system and can be placed in locations which can not accommodate the physical configurations shown in FIGS. 2A and 2B. FIG. 2D shows a software ATM 100 as a table unit which a user might sit at in a cafe or coffee house. In one embodiment, software ATM 100 may be a freestanding device adapted to be installed with or without an Internet connection and storing a plurality of computer programs.

Software ATM 100 includes a general purpose computer system (e.g., a personal computer system) that includes a processor, a display screen, user input devices, and a communications unit for communicating with PDA 210. This communications unit can support both contact-based or wireless communications. Software ATM 100 also comprises an operating system. The operating system optionally supports emulation of operating systems utilized upon PDA 210 (e.g., a Palm OS® Emulator).

Software ATM 100 may be placed in locations that facilitate the selling of software titles offered therein to end users. For example, software ATM 100 may be placed in a retail market place selling portable computer systems. This facilitates the marketing of software applications to users without requiring extensive retail display space for the variety of titles offered. Furthermore, a wider variety of software titles can be stored on software ATM 100 than would typically be displayed at a retail outlet. Other locations software ATM 100 may be placed include shopping malls, airport waiting areas, coffee shops, near public telephones, bookstores, or other locations where vending machines can be envisioned. However, the present invention can be used to download software and content which are only being rented by a user as well.

FIGS. 2C and 2D show embodiments of the present invention which are configured to be placed on a table or desk in a manner similar to a desktop PC, or as a free standing console resembling a table (FIGS. 2C and 2D respectively). Software and content can be rented for a limited time period to allow a user to determine whether they want to purchase a full version of the title or if the user only wants to utilize the software or content for a limited amount of time.

Software ATM 100 is fully automated in that no other human operator is required to conduct a transaction of software titles or software services with an end user. An end user may purchase or rent software titles, content, or software services directly from the software ATM 100 using, for example, a cash transaction, a credit card, or a debit card and download the software titles and content directly into PDA 210. Cash transactions may be performed using vending slots 116 of the software ATM 100 that are analogous to a standard vending machine (e.g., for the purchase of toys, food items, or stamps). Credit card information may be entered via a keyboard (e.g., alpha-numeric input 113 of FIG. 1) of the software ATM 100, wirelessly by PDA 210 using an infrared or Bluetooth communications link or other wireless communications link, or via magnetic card reader 115 mounted within the software ATM 100. However, the present invention is well suited to utilize a variety of methods for conducting transactions including E-wallet, a gift certificate stored on PDA 210, etc.

In operation, a user of PDA 210 can commence a transaction with software ATM 100 either by pointing PDA 210 at software ATM 100 and requesting a connection wirelessly (e.g., via Bluetooth, Infrared, or other wireless connections), or by inserting PDA 210 into a cradle 220. During a session, an emulated version 230 of PDA 210 may appear on touch screen 112 if emulation is requested. The user can interact with the emulated version 230 of PDA 210, through PDA 210 itself, through touch screen 112, or by manually manipulating cursor controller 114.

In another embodiment, software ATM 100 may have no user interaction devices (e.g., touch screen 112, alpha-numeric input 113, cursor controller 114, etc.) at all. This allows vendors to locate software ATM 100 away from public view if so desired. In one embodiment, a user can be made aware of the presence of software ATM 100 using the Bluetooth discovery process if the user's PDA is configured for this. All displays and user interaction are accomplished using PDA 210 which wirelessly communicates the user selections to software ATM 100. Payment can be made using credit card information stored on PDA 210, E-wallet, a gift certificate stored on PDA 210, etc.

Importantly, the user can cause a directory of computer software programs and content stored in software ATM 100 to be displayed. Navigating the directories can be accomplished either wirelessly, using PDA 210, or manually by interacting with touch screen display 112 or manipulating cursor controller 114. In one embodiment, the directory is automatically displayed when communications with PDA 210 are initiated. The directory can include: the name of the content or software title; a category of the software application; a short description of the software application; instructions on utilizing the application; its price; and a rating of the application (see FIG. 4).

The user can select an application program (e.g., Lakers V Jazz from Basketball directory 310 of FIG. 3, Solitaire game from Games directory 320 of FIG. 3, or read stock quotes from Stocks directory 330 of FIG. 3) either wirelessly or manually, as stated before, and install the selected application program in emulated version 230 of PDA 210. The user can then test run the selected application program on software ATM 100 using the emulated version of PDA 210. If the user is satisfied with the operation of the selected application program and decides to purchase or to rent the selected application program or content, the user may exit the test mode by pressing, for example, button 240, wirelessly via PDA 210, or by interacting with touch screen display 110. The user can commence transaction procedures to purchase the application program by, for example pressing button 250, wirelessly via PDA 210, or by interacting with touch screen display 110.

The user may conduct payment by inserting cash/coins into the vending slots 230, by sliding a credit card or a debit card into magnetic card reader 113, via E-wallet, a gift certificate stored on PDA 210, etc. Once purchased, the selected application program can be downloaded into PDA 210, either via contacts from cradle 220, via a wireless communication link (e.g., via a Bluetooth, Infrared, or other wireless link). Furthermore, the software or content can be downloaded onto removable storage media inserted into removable storage slot 117. The removable media can then be inserted into PDA 210 and the software or content can then be downloaded into PDA 210.

FIG. 3 is an illustration of exemplary software directories that can be displayed on software ATMs. A plurality of different directories can be displayed in accordance with user directives. A user can select directories to access using on screen menus displayed upon touch screen display 112 or PDA 210. Any of the listed titles in the directories can be selected by touching display 112 of ATM 100, using cursor controller 114 to navigate an on-screen cursor, or using any number of other well known user interface techniques for selecting screen displayed items. The software and related directories may be stored locally on software ATM 100 (e.g., on data storage device 105 of FIG. 1) or remotely via a network connection to a server computer.

For example, a user may wish to purchase a chess game software, rent a video game of a basketball game played between the Los Angeles Lakers and the Utah Jazz and would like to get a report on the XYZ stocks. The user causes Basketball directory 310 to be displayed on the emulated version 230 of PDA 210 of FIG. 2. The user can conduct a test run of the software program, and if satisfied, can download the program onto PDA 210 of FIG. 2.

The user can display software directory 320 of all games available on software ATM 100. The user can load chess game software on emulated version 230 of PDA 210 and perform test runs on the software. The user can rent or purchase the software by downloading the software into PDA 210 as previously described.

The user may wish to get a report of the status of XYZ stock. The user can establish communications (e.g., via cradle, Bluetooth, IR, etc.) with software ATM 100 and get the report displayed either on their device or on the software ATM 100.

FIG. 4 is an illustration of another embodiment of the present invention, where a set of directories of computer software includes software ratings for each title. Such directories can be available in a network of software ATMs or in a stand-alone software ATM. The stars associated with each entry are an indication of favorable ratings by a user of that particular application. For example, the ratings can come from user testimonials, or from critical reviews.

Figure 5:
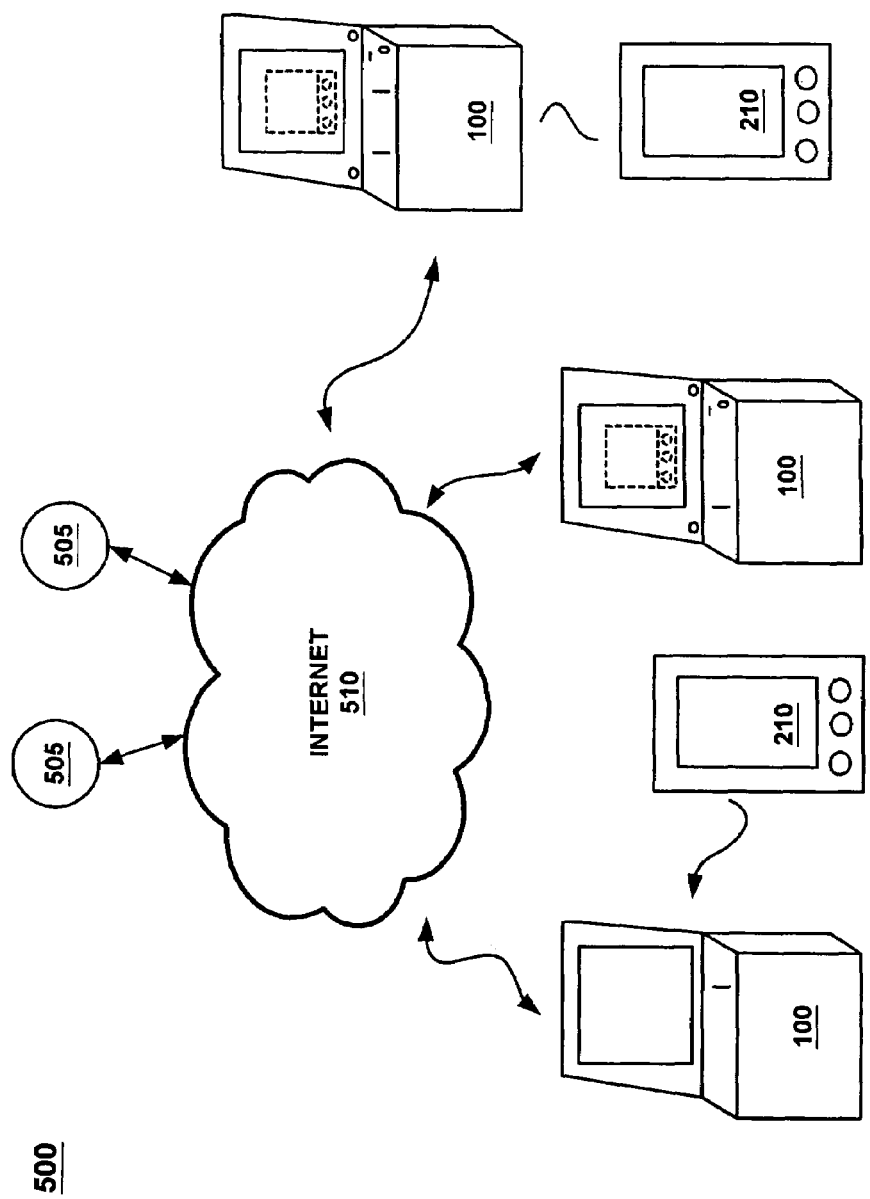
FIG. 5 illustrates a network of remotely located software ATMs and server systems capable of dispensing computer programs to a portable electronic device in accordance with embodiments of the present invention.

FIG. 5 is an illustration of a software distribution network 500 in accordance with an embodiment of the present invention that makes use of software ATMs 100. The network includes a plurality of networked software ATMs 100 that are coupled (e.g., via Internet 510 or a dedicated network connection) to networked server computers 505. The software ATMs 100 are capable of dispensing computer programs to a plurality of PDAs 210. Software ATMs 100, as discussed above, may be installed in a variety of public/retail places (e.g., restaurants, coffee shops, bookstores, airports, retailers, mall, etc.) and be accessible to the public at large.

Networked sever computer 505 regulates the software content of the software ATMs 100 by downloading various software titles to the software ATMs. The networked server computers are responsible for maintaining current versions of software titles that are offered and also for performing other related services, such as providing back-up and archive services (described further below). In one embodiment, only the most popular or most recently created software titles are stored and maintained within software ATMs 100. A desired software title that is not stored in a particular software ATM can be accessed and downloaded to the ATM from a server 505, and then provided to the user.

An owner of PDA 210, who wishes to purchase or rent a computer software program or other content, can use any one of software ATMs 100 on the network to access an application program stored in any other software ATM 100 or an application program stored in one of the networked servers 505 as previously described.

A user of PDA 210 can conduct a sales transaction or a rental transaction with any remotely located software ATM 100 within the network 500 depending on the location of the two devices. For example, the user of PDA 210 can commence the transaction with software ATM 100 by inserting PDA 210 onto cradle 220, by transmitting a "request for connection" signal wirelessly (e.g., Bluetooth, IR, etc.) to a software ATM within connection range, or in response to a message from software ATM 100 if a user's PDA is detected using the Bluetooth discovery process. In one embodiment, the "request for connection" signal includes the identification number of PDA 210.

Software ATM 100 may be a "PC" based device in one embodiment and may include emulator software (e.g., Palm OS® Emulator). An emulated rendition or animation image 230 of PDA 210 appears on touch screen display 112 if emulation is desired. The user can interact with emulated version 230 of PDA 210, either through touch screen 112, PDA 210, or using cursor controller 114.

As described above, the user can access a display of directories of computer software programs (e.g., basketball directory 410 of FIG. 4, Games directory 420 of FIG. 4, or stock directory 430 of FIG. 4) which are either stored in software ATM 100 or stored on archive 505. These directories can be displayed wirelessly through PDA 210 or on touch screen display 112. The directories may be organized by a number of different categories, including the type of software, as shown in FIG. 4, most popular software, etc.

A user can select one of the displayed application programs from the displayed directory (e.g., Lakers v Jazz from Basketball directory 410 of FIG. 4, Solitaire from Games directory 420, etc.). The selection may be done either wirelessly by using PDA 210, or manually using touch screen display 112 or cursor controller 114. The selected program can be installed on emulated version 230 of PDA 210. Using the optional emulator, the user can conduct a test run of the selected application program on the emulator, either wirelessly or manually with the aid of cursor controller 114. Once the user is satisfied with the operation of the selected application program and decides to purchase or rent the selected application program, the user may exit the test mode by pressing on button 240, wirelessly using PDA 210, or making an indication on touch screen display 112. The user can download and install an application program or other content on PDA 210 by, for example, pressing on button 250, wirelessly using PDA 210, or making an indication on touch screen display 112 which initiates a purchase transaction, including the download functionality.

Once communications have been established between PDA 210 and software ATM 100, a user can select various services which can be performed using network 500. Services which can be provided by network 500 include updating software versions, archiving a user's PDA settings, receiving E-mail messages, accessing news services via the Internet, and storing programs not currently needed in a personal archive.

For example, a user of PDA 210 establishes a session with software ATM 100, either wirelessly or by inserting PDA 210 onto cradle 220. The user then requests software upgrade services, which causes the software titles loaded on the device 210 to be recognized by the software ATM. The software ATM then displays on screen 112 a directory of software including the latest versions, if any, of the computer programs that exist on device 210. The user can test run the latest version of the software on emulated version 230 of PDA 210 by downloading the latest version of the software in the emulated version 230 of PDA 210. If the user is satisfied of the result of the test and decides to replace the old version with the new version, then the user presses button 250 to commence a transaction and to download the new version in PDA 210, replacing the old version. In one embodiment, when communications are initiated between software ATM 100 and PDA 210, software ATM 100 determines the version of each of the programs loaded onto PDA 210. If a newer version of a software program is available, software 210 will send a message to the user informing them of the availability of a newer software version. The user can either upgrade to the newer version immediately, or test it in the emulated version 210 of PDA 210. This facilitates distributing software updates as the updated version can be supplied to the server which in turn provides the updates across the network.

Network 500 also provides the capability to archive a user's PDA. Once communications are established between software ATM 100 and PDA 210, a user can choose to archive the settings on PDA 210. One of the most useful features of PDAs is the level of configurability which can be achieved. This allows a user to customize the settings on the PDA to best suit their needs. These settings can be stored, for example, on server 505 to facilitate restoring these settings on a new PDA. For example, a user whose PDA has been broken, lost, or stolen can purchase a new PDA, connect with software ATM 100, and restore their archived settings which are stored on server 505. This can save the user a considerable amount of time that is required to configure the settings on a new PDA.

Another advantage in storing a user's PDA settings is that they can be used in conjunction with emulator 230 when testing software programs. Occasionally, a given program may conflict with other programs already loaded onto PDA 210. The archived settings can be downloaded from server 505 onto software ATM 100 and into emulator 230 of PDA 210. This allows emulator 230 to closely imitate the performance of a user's particular PDA rather than a generic emulated version of a PDA. The user can then test a given program on emulator 230 to ensure that a newly downloaded program is compatible with existing programs before downloading onto PDA 210.

A user can also utilize network 500 to store software programs or other content which have been purchased but are not currently needed. In this embodiment of the present invention, once communications are established with software ATM 100, the user can elect to utilize this feature to download the unneeded programs or content onto an inactive list. The user can subsequently access this list from any software ATM which is a part of network 500. The user can only access programs or content on their own inactive list by supplying, for example, a password or an identification number stored on PDA 210.

Figure 6:
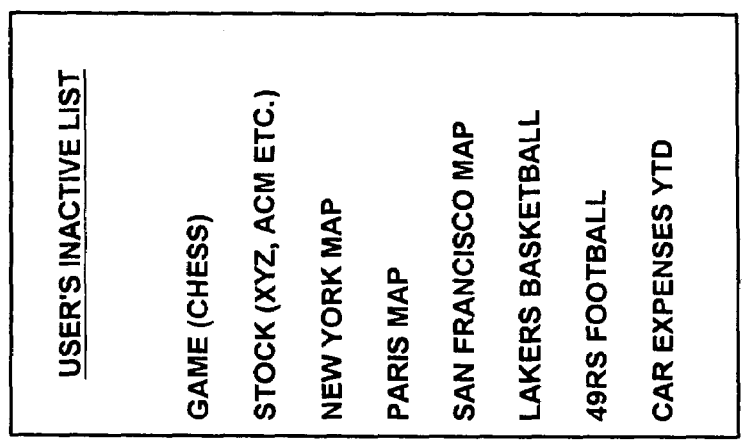
FIG. 6 illustrates an exemplary list of inactive computer programs stored in an archive in accordance with embodiments of the present invention.

FIG. 6 shows an exemplary directory 600 of unused computer software programs that have been stored in a server (e.g., server 505 of FIG. 5) for future activation. These archived software titles are called "inactive" software titles herein. The user may access any of the pre-owned and inactive computer programs stored in server 505 and may download an inactive software title back into PDA 210 via software ATM 100. The user activates the inactive program by displaying a list of inactive programs (e.g., directory 600 of FIG. 6) and marking the program for activation which causes it to be downloaded from the software ATM into the device 210. If a software update of a program stored on an inactive list becomes available, it can be offered to the user when the inactive program is downloaded back onto PDA 210.

For example, one program which is widely used on PDAs is a map program. Street maps of various cities can be loaded onto PDA 210 and used as a navigation aid. The files required to store this information can be quite large and may consume a large amount of the memory available on PDA 210. If a user is traveling to New York City, they can download the map files of other cities which they do not require while in New York (e.g., Seattle, and Atlanta) to free memory space on PDA 210. Upon returning to Atlanta, the user can download the New York map from PDA 210 onto the inactive list and load the Atlanta map back onto PDA 210. If a new version of the Atlanta map becomes available, the user can be informed of its availability and given the option of downloading the new version.

In another embodiment of the present invention, network 500 can be used to provide Internet access to a user. When communications between PDA 210 and software ATM 100 are established, a user can utilize software ATM 100 to access Internet 510. This allows a user to access the Internet if PDA 210 does not have such a capability built in. Furthermore, the user can remotely access their computer to perform routine tasks such as reading their E-mail, updating their calendar, etc.

In summary, embodiments of the present invention provide a networked software and service dispensing vending machine also referred to as a "software ATM". According to one embodiment of the present invention, a software ATM installed at a public location may be used to commercially dispense computer software to the public. The present invention optionally allows a user of portable computer devices to emulate a version of their portable computer on the display of the software ATM and to test a given computer software program on the emulator. The user can purchase the computer program if satisfied with the test result and download the program directly into their portable computer. Another embodiment of the present invention couples a plurality of software ATMs in a network accessible to the public. The networked software ATMs can provide a variety of services including archiving of software programs, providing software updates, restoring of lost information, and Internet access.

The foregoing description of specific embodiments of the present invention have been presented for purposes of illustration and description. They are not intended to be exhaustive or to limit the invention to the precise forms disclosed. Many modifications and variations are possible in light of the above teaching. The embodiments were chosen and described in order to best explain the principles of the invention and its practical application, to thereby enable others skilled in the art to best utilize the present invention and various embodiments with various modifications as are suited to the particular use contemplated. It is intended that the scope of the present invention be defined by the Claims appended hereto and their equivalents. The software may be loaded into a variety of electronic devices. The present invention may be used to emulate a version of a given device

What is claimed is:

1. A networked software dispensing vending machine comprising:
   a bus;
   a memory unit coupled with said bus for storing one or more software programs;
   a communications interface coupled with said bus for communicating with a portable computer system;
   a display device coupled with said bus, said display device displaying an emulation of an operating system used by said portable computer system to test the one or more software programs by installing the one or more software programs entirely onto the emulation of the operating system prior to actually downloading the one or more software programs onto the portable computer system;
   a network interface coupled with said bus for communicatively coupling with a remote network server;
   a device coupled with said bus for receiving a payment for said one or more software programs; and
   a processor coupled with said bus for transferring said one or more software programs to said portable computer system in response to said payment.

2. The networked software dispensing vending machine as recited in claim 1, wherein said communications interface is a wireless communications interface.

3. The networked software dispensing vending machine as recited in claim 1, wherein said remote network server transmits additional software to said network interface for storage on said memory unit.

4. The networked software dispensing vending machine as recited in claim 1, wherein said network interface communicates a backup configuration of said portable computer system to said remote network server.

5. The networked software dispensing vending machine as recited in claim 4, wherein the configuration of said portable computer system is restored using said backup configuration.

6. The networked software dispensing vending machine as recited in claim 4, wherein said display device displays, in conjunction with said backup configuration, an emulated version of said portable computer system.

7. The networked software dispensing vending machine as recited in claim 1, wherein said remote network server archives an inactive software program for said portable computer system.

8. The networked software dispensing vending machine as recited in claim 1, wherein said remote network server transmits an updated version of said software program to said portable computer system.

9. A software dispensing vending machine comprising:
a bus;
a memory unit coupled with said bus for storing a software program;
a communications interface coupled with said bus for communicating with a portable electronic device;
a display device coupled with said bus, said display device displaying an emulation of an operating system used by said portable electronic device to test the software program by installing the software program entirely onto the emulation of the operating system prior to actually downloading the software program onto the portable electronic device;
a device for accepting a payment for said software program coupled with said bus; and
a processor coupled with said bus for transferring said software program to said portable electronic device in response to said payment.

10. The software dispensing vending machine as recited in claim 9, wherein said communications interface is a wireless communications interface.

11. The software dispensing vending machine as recited in claim 9, further comprising a network interface for communicating with a remote network server.

12. The software dispensing vending machine as recited in claim 11, wherein said remote network server transmits additional software to said network interface for storage onto said memory unit.

13. The software dispensing vending machine as recited in claim 12, wherein said network interface transmits a backup configuration of said portable electronic device to said remote network server for storage thereon.

14. The software dispensing vending machine as recited in claim 12, wherein said portable electronic device is restored using said backup configuration.

15. The software dispensing vending machine as recited in claim 13, wherein said display device displays an emulated version of said portable electronic device using said backup configuration.

16. The networked software and service dispensing vending machine as recited in claim 9, wherein said remote network server stores an inactive software program for said portable electronic device.

17. The networked software and service dispensing vending machine as recited in claim 9, wherein said remote network server updates said software program.

18. A networked device for dispensing software comprising:
a bus;
a memory unit coupled with said bus for storing a software program;
a communications interface coupled with said bus for communicating with a hand held computer system;
a display device coupled with said bus, said display device displaying an emulation of an operating system used by said hand held computer system to test the software program by installing the software program entirely onto the emulation of the operating system prior to actually downloading the software program onto the hand held computer system;
a network interface coupled with said bus for communicating with a network;
a device coupled with said bus for receiving a payment for said software program; and
a processor coupled with said bus for downloading said software program into said hand held computer system in response to said payment.

19. The networked device for dispensing software as recited in claim 18, wherein said communications interface is a wireless communications interface.

20. The networked device for dispensing software as recited in claim 18, wherein said network interface receives additional software from said network for storage on said memory unit.

21. The networked device for dispensing software as recited in claim 18, wherein said network stores a backup configuration of said hand held computer system.

22. The networked device for dispensing software as recited in claim 21, wherein said hand held computer system is restored using said backup configuration.

23. The networked device for dispensing software as recited in claim 21, wherein said display device displays an emulated version of said hand held computer system using said backup configuration.

24. The networked device for dispensing software as recited in claim 18, wherein said network stores an inactive software program transmitted by said hand held computer system.

25. The networked device for dispensing software as recited in claim 18, wherein said network transmits an updated version of said software program to said hand held computer system.

* * * * *